United States Patent
Iyer et al.

(10) Patent No.: US 7,352,362 B2
(45) Date of Patent: *Apr. 1, 2008

(54) INTEGRATED VIRTUAL HUB CHIP

(75) Inventors: Sree M. Iyer, San Jose, CA (US); Larry L. Jones, Palo Alto, CA (US); Arockiyaswamy Venkidu, Menlo Park, CA (US)

(73) Assignee: MCM Portfolio LLC, Cupertino, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/104,782

(22) Filed: Apr. 12, 2005

(65) Prior Publication Data
US 2005/0216622 A1 Sep. 29, 2005

Related U.S. Application Data

(63) Continuation-in-part of application No. 10/065,333, filed on Oct. 4, 2002, now Pat. No. 6,903,727.

(51) Int. Cl.
*G09G 5/00* (2006.01)

(52) U.S. Cl. .................. 345/168; 345/156; 345/160

(58) Field of Classification Search ........ 345/156–168; 710/8–15, 62–76, 100, 129
See application file for complete search history.

(56) References Cited

U.S. PATENT DOCUMENTS

| | | | |
|---|---|---|---|
| 5,841,424 A | 11/1998 | Kikinis | |
| 6,230,226 B1 | 5/2001 | Hu et al. | |
| 6,307,538 B1 | 10/2001 | Bacon | |
| 6,442,734 B1 | 8/2002 | Hanson et al. | |
| 6,460,094 B1 | 10/2002 | Hanson et al. | |
| 6,601,124 B1 | 7/2003 | Blair | |
| 6,903,727 B2 | 6/2005 | Mambakkam et al. | |
| 6,963,935 B1 | 11/2005 | Young et al. | |
| 6,978,335 B2 | 12/2005 | Lee | |
| 2002/0099887 A1 | 7/2002 | Lu | |

FOREIGN PATENT DOCUMENTS

WO  9946669 A1  9/1999

*Primary Examiner*—Vijay Shankar
(74) *Attorney, Agent, or Firm*—John P. Ward; Greenberg Traurig LLP (57) ABSTRACT

An apparatus that includes a serial port configured to interface with a separate host, one serial interface engine (SIE) connected to the serial port, and at least a first interface unit and a second interface unit connected to the one serial interface engine. In one embodiment, the apparatus includes a virtual hub comprising a firmware unit configured to emulate a hub having multiple ports. In another alternative embodiment, the apparatus is a Universal Serial Bus (USB) peripheral and the serial port is a Universal Serial Bus port. In another alternative embodiment, apparatus is housed within a keyboard.

20 Claims, 6 Drawing Sheets

ions filed on Oct. 4, 2002, now U.S. Pat. No. 6,903,
INTEGRATED VIRTUAL HUB CHIP The present application is also a continuation in part of the non-provisional filed application entitled *Integrated Virtual Hub Chip*, filed on Oct. 4, 2002, now U.S. Pat. No. 6,903,727 Ser. No. 10/065,333, which is also incorporated herein by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present invention relates generally to serial bus hubs, and more specifically to an improved configuration of the same.

BACKGROUND

Keyboards lend themselves as extension bases for other functions. For example, U.S. Pat. No. 5,841,424 describes a keyboard that has multiple extension bases with serial ports.

Figure 1:
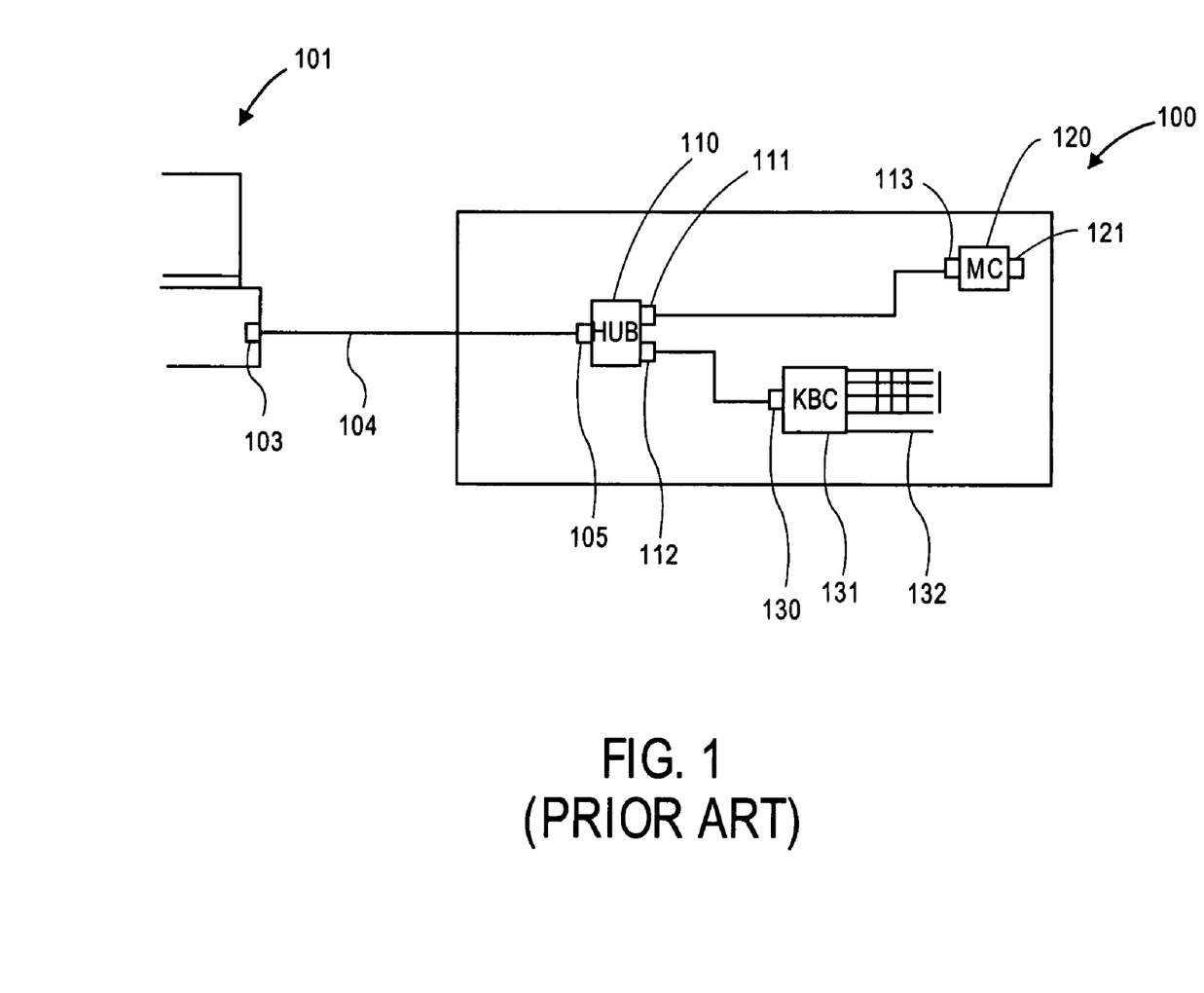
FIG. 1 illustrates a prior art USB keyboard with additional extensions.
Figure 2:
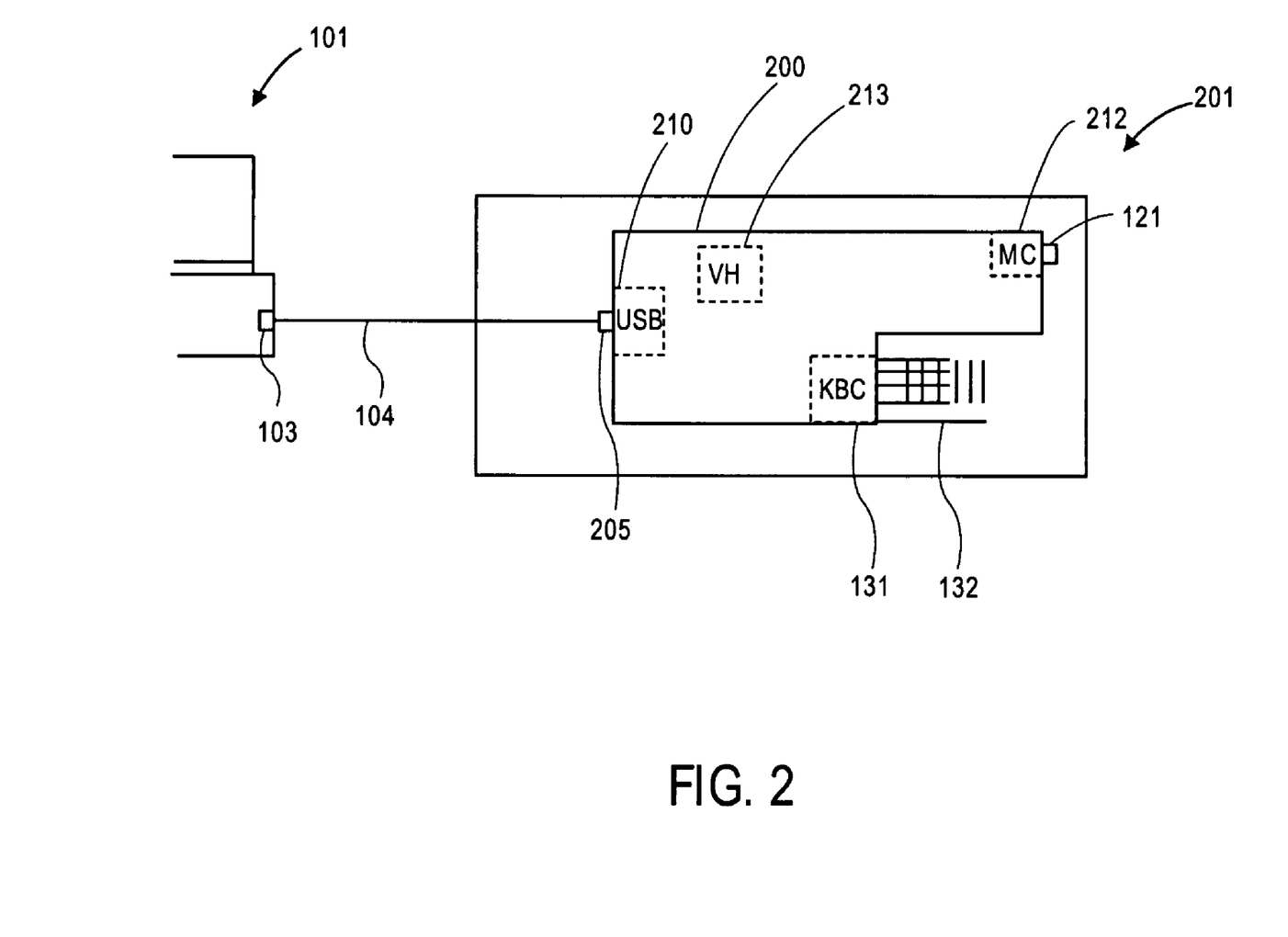
FIG. 2 illustrates block level illustration of the USB port and adjoining functionality, according to one embodiment.

FIG. 1 shows an overview of a generic USB keyboard with additional extensions. Keyboard 100 contains a USB hub 110 with USB interface 105, which is connected through USB link 104 to a port 103 on the host computer system 101. USB hub 110 controls, in this example, a keyboard controller 131. The controller 131 has a keyboard matrix 132 and its own USB port 130, which connects to USB port 112 of hub 110. A card reader 120 is also present, with a media port 121. Card reader 120 has a port 113 that also connects to the USB hub 110 via USB port 111.

The approach shown in FIG. 1 results in a relatively expensive product. It requires at least three serial interface engines (SIEs), three processors or controllers (for each of the entities of the hub, the card controller, and the keyboard controller), and extra logic to handle general functions.

What is needed is an integrated, more cost-effective method that allows multiple, multi-pin devices to be connected via one USB line to a host computer, thus reducing the need for expensive multiple internal USB connections.

SUMMARY

An embodiment of the present invention provides an apparatus that includes a serial port configured to interface with a separate host, one serial interface engine (SIE) connected to the serial port, and at least a first interface unit and a second interface unit connected to the one serial interface engine. In one embodiment, the apparatus includes a virtual hub comprising a firmware unit configured to emulate a hub having multiple ports. In another alternative embodiment, the apparatus is a Universal Serial Bus (USB) peripheral and the serial port is a Universal Serial Bus port. In another alternative embodiment, apparatus is housed within a keyboard.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

The virtual hub function is a component of the novel art of this disclosure. Said virtual hub represents the MFC and the keyboard in the current example as two USB entities connected to a hub; however, the physical hub is eliminated, resulting in a less costly approach.

Figure 3:
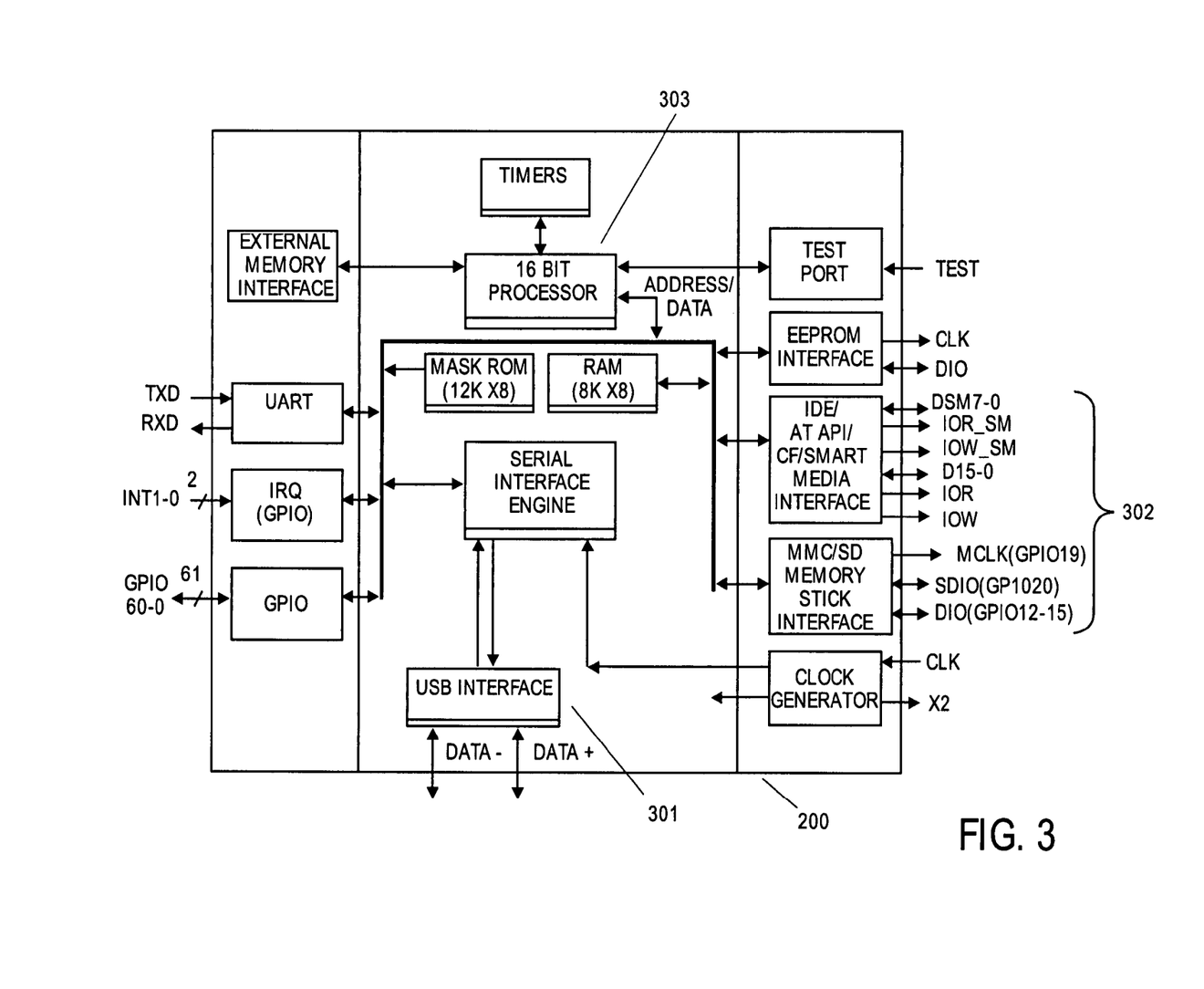
FIG. 3 illustrates an overview block diagram, according to one embodiment.

FIG. 3 is an overview block diagram of chip 200 as described in this embodiment. Chip 200 as shown in FIG. 3 contains typical elements of a normal embedded microcontroller. Of relevance to the novel art of this disclosure is USB interface section 301, the parallel I/O section 302, and the CPU 303. Also present are other functions often found in embedded microcontrollers.

Figure 4:
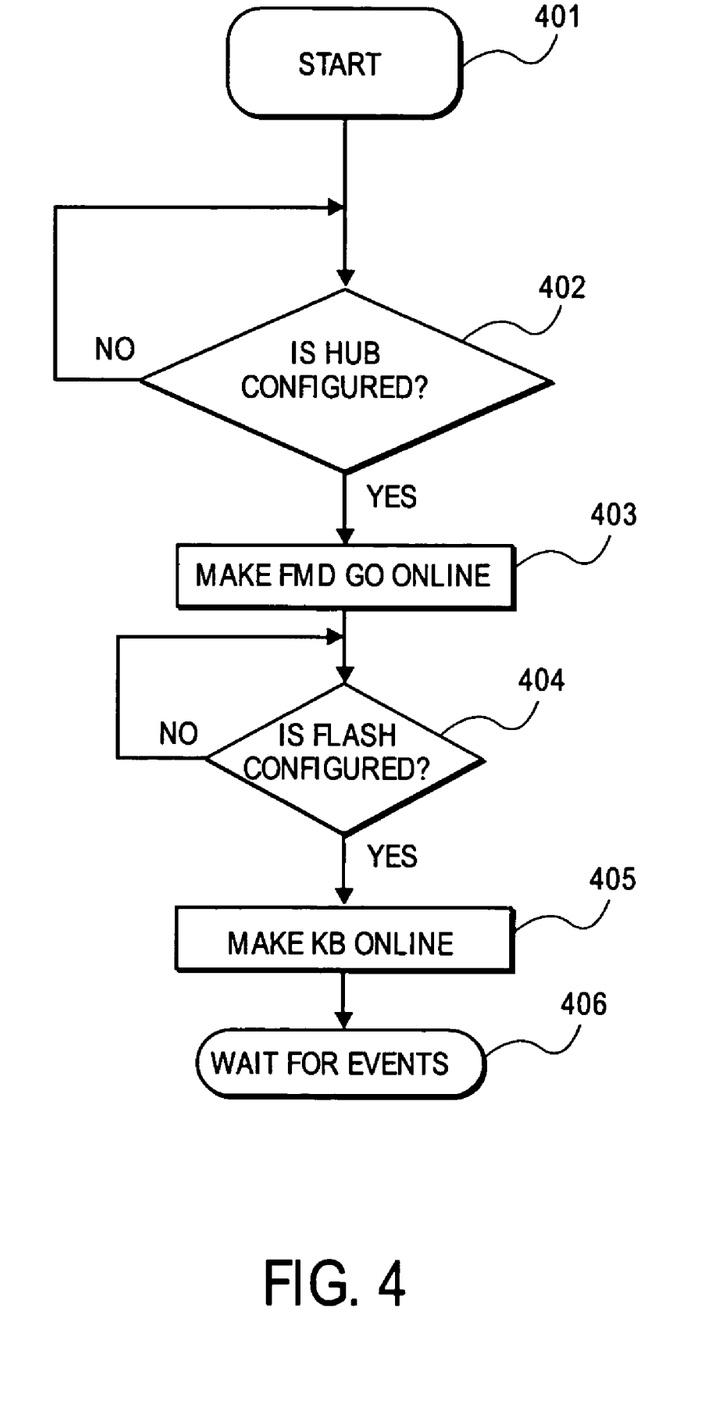
FIG. 4 illustrates flow diagram of the functional process, according to one embodiment.

FIG. 4 shows a simplified diagram of the functional process of the virtual hub. After initiation at step 401, the hub must be configured by software. This configuration step 402 may require repetitive attempts until the host CPU is ready to communicate with the hub and provide the configuration parameters. Once that step has been passed, in step 403 the flash media drive or flash card controller is brought online. In step 404, the drive or controller looks to see if any valid medium is present, and, if so, it configures the medium accordingly. Note that No Medium is also considered a valid configuration. Once the medium is configured, in step 405 the keyboard is brought online as an additional virtual USB device. After these steps, the initialization is complete, and normal operation commences at step 406.

Figure 6:
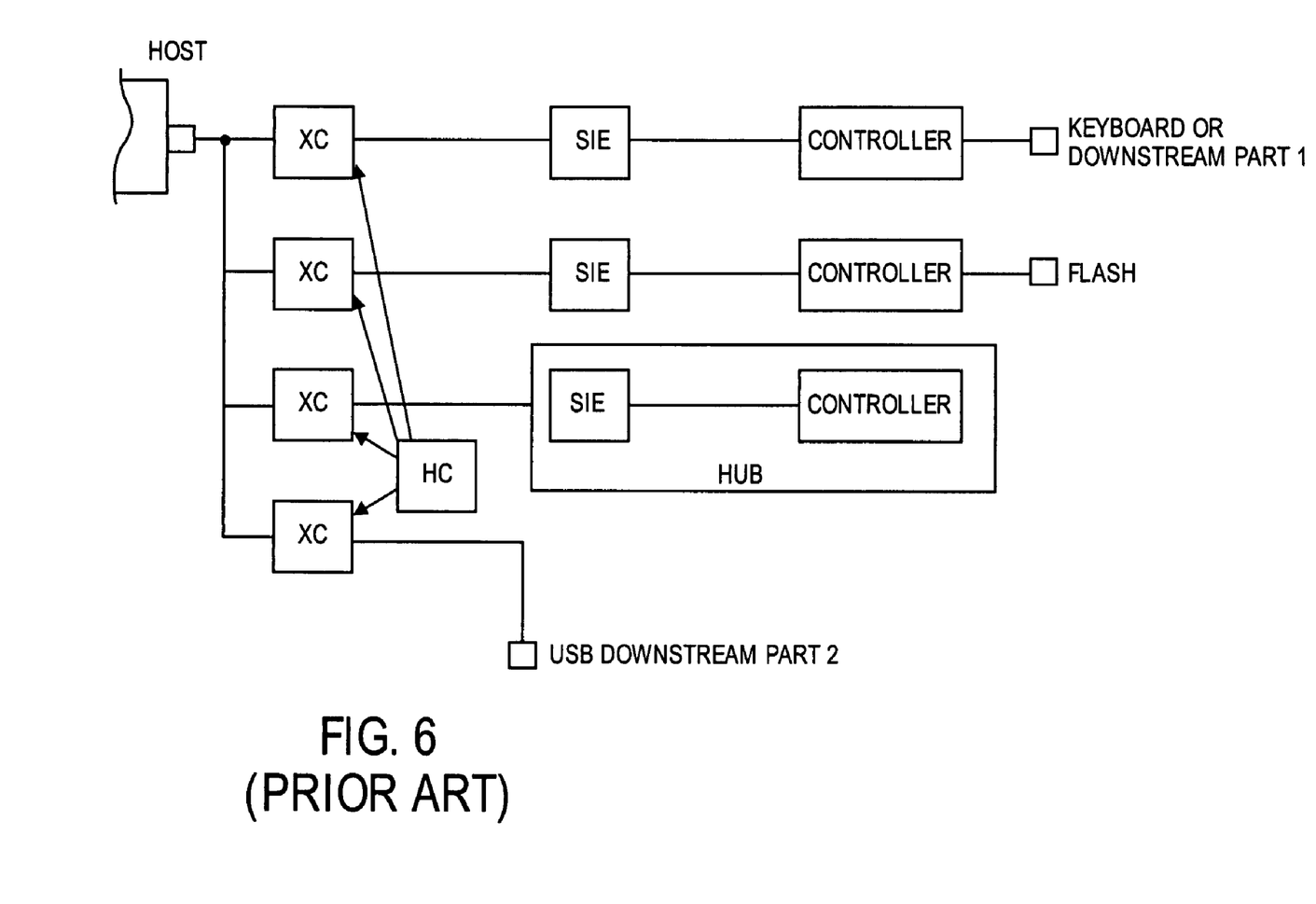
FIG. 6 illustrates a prior art USB keyboard with additional extensions, according to one embodiment.

FIG. 6 shows a conventional approach for a keyboard with an FMD, using three SIEs and three controllers, as a way used in current art to implement the same functionality, but at a much higher cost.

Figure 5:
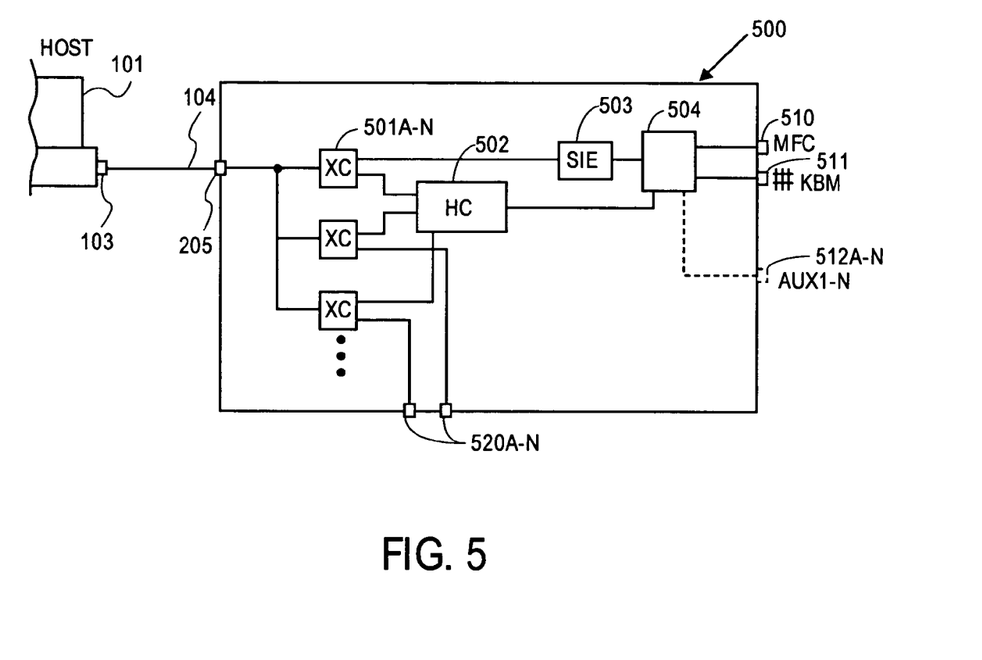
FIG. 5 illustrates block level illustration of the USB port and adjoining functionality, according to an alternative embodiment.

FIG. 5 shows host computer system 101 with port 103 connected through USB link 104 to USB port 205 of chip 500. Chip 500 is yet another embodiment, in this case with a more hybrid type of configuration. It contains a real hub function, multi flash interface 510, interface 511, and potentially additional auxiliary interfaces 512 a-n. In some cases the interface 511 may not be implemented, but other auxiliary functions may. Such auxiliary functions may include analog and digital functions such as controlling or measuring voltages.

In one embodiment, interface 511 is chosen from one of a human interface device, a secure channel, a video capture device, a printer device, a scanner device, a wireless class device. The human interface device provides an interface to a user and includes such devices as keyboard, mouse, joy stick, game pad, touch pad, biometric sensor, and so on. The secure channel may comprise of an authentication scheme using hash algorithms and optionally includes a challenge/response method to make the process robust. The Hash algorithms may comprise of one among a set consisting of MD5, SHA-1, SHA-256, SHA-384, SHA-512, HMAC-MD5, HMAC-SHA1. The wireless class device supports a wireless protocol and may be for instance, a device supporting the Wi-Fi Wireless protocol comprising of IEEE Standards 802.11a, 802.11b, 802.11e, 802.11g, a device supporting the Blue tooth protocol, or a device supporting the Wireless USB protocol.

In this case the hub controller 502 is implemented using cross switches XC 501 a-n (as is normally done in hubs). These switches 501a-n help the hub controller 502 to control the connectivity through its control lines to each of the cross switches. Two of the cross switches in this example are passed through as ports 520 a-n to use for other (external) USB devices. Novel, however, is the use of a single SIE 503 for multiple internal functions. From SIE 503 the signals go into embedded controller 504, which controls the multifunction connector 510, the keyboard connector 511, and additional connectors 512 a-n, as described above.

Those additional connectors can be used for other, additional functions to be integrated. In some instances, the pins used for the keyboard matrix may be used for other functions, depending on what kind of device or system the chip 500 is integrated. In some cases hub controller 502 and interface controller 504 are one and the same microcontroller, in some cases the hub controller is an intelligent peripheral to interface controller 504, and in some cases they are two separate microcontrollers communicating with each other. In yet other cases, hub controller 502 may have its own SIE, and interface controller 504 may also have its own SIE.

In some embodiments the hub controller 502 and the embedded controller 504 may share one CPU. In other embodiments, they may be separated, with the hub controller embodied entirely in hardware to provide sufficient speed for enhanced standards such as USB 2.0, etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An electronic apparatus comprising:
a serial port configured to interface with a separate host;
one serial interface engine (SIE) connected to the serial port;
at least a first interface unit and a second interface unit connected to the SIE; and
a virtual hub connected to the SIE, the virtual hub comprising a firmware unit configured to emulate a hub having multiple ports.

2. The apparatus of claim 1, wherein the first interface unit is chosen from one of a human interface device, a secure channel, a video capture device, a printer device, a scanner device, or a wireless class device.

3. The apparatus of claim 1, wherein the second interface unit is a flash media drive.

4. The apparatus of claim 1, wherein the apparatus is housed within a keyboard.

5. The apparatus of claim 1, wherein the apparatus is a Universal Serial Bus (USB) peripheral and the serial port is a USB port.

6. The apparatus of claim 1, wherein the SIE, the first interface unit and the second interface unit are connected to a controller.

7. The apparatus of claim 1, wherein a third interface unit is connected to the SIE.

8. The apparatus of claim 1, wherein the serial port, the SIE, the first interface unit and the second interface unit are integrated on a single device.

9. The apparatus of claim 1, wherein a third interface is connected to the serial port, the third interface having a second SIE.

10. The apparatus of claim 1, wherein the human interface device comprises of one or more of a keyboard, mouse, joy stick, game pad, touch pad, or biometric sensor.

11. The apparatus of claim 1, wherein the wireless class device comprises of one or more of a device supporting a Wi-Fi wireless protocol comprising of IEEE Standards 802.11a, 802.11b, 802.11e, 802.11g, a device supporting a Bluetooth protocol, and a device supporting a wireless USB protocol.

12. The apparatus of claim 1, wherein the secure channel comprises an authentication scheme using hash algorithms.

13. The apparatus of claim 12, where the hash algorithms comprise of one or more of MD5, SHA-1, SHA-256, SHA-384, SHA-512, HMAC-MD5 or HMAC-SHA1 algorithms.

14. A method comprising:
connecting a serial interface engine (SIE) to a serial port configured to interface with a separate host;
connecting at least a first interface unit and a second interface unit to the SIE; and
connecting a virtual hub to the SIE, the virtual hub comprising a firmware unit configured to emulate a hub having multiple ports.

15. The method of claim 14, further comprising:
selecting the first interface unit from one of a human interface device, a secure channel, a video capture device, a printer device, a scanner device, or a wireless class device.

16. The method of claim 14, wherein the second interface unit is a flash media drive.

17. The method of claim 14, further comprising:
integrating the serial port, the SIE, the first interface unit and the second interface unit on a single device.

18. The method of claim 17, further comprising:
housing the single device within a keyboard.

19. The method of claim 15, wherein the human interface device comprises of one or more of a keyboard, mouse, joy stick, game pad, touch pad, or biometric sensor.

20. An apparatus comprising:

means for connecting a serial interface engine (SIE) to a serial port configured to interface with a separate host;

means for connecting at least a first interface unit and a second interface unit to the SIE; and means for connecting a virtual hub to the SIE, the virtual hub comprising a firmware unit configured to emulate a hub having multiple ports.

* * * * *

UNITED STATES PATENT AND TRADEMARK OFFICE
CERTIFICATE OF CORRECTION

PATENT NO. : 7,352,362 B2  Page 1 of 1
APPLICATION NO. : 11/104782
DATED : April 1, 2008
INVENTOR(S) : Sree M. Iyer et al.

It is certified that error appears in the above-identified patent and that said Letters Patent is hereby corrected as shown below:

In Column 4, claim 10
Line 45, replace "The apparatus of claim 1" with --The apparatus of claim 2--

In Column 4, claim 11
Line 48, replace "The apparatus of claim 1" with --The apparatus of claim 2--

In Column 4, claim 12
Line 54, replace "The apparatus of claim 1" with --The apparatus of claim 2--

Signed and Sealed this

Twelfth Day of January, 2010

David J. Kappos
*Director of the United States Patent and Trademark Office*